Patented Aug. 10, 1937

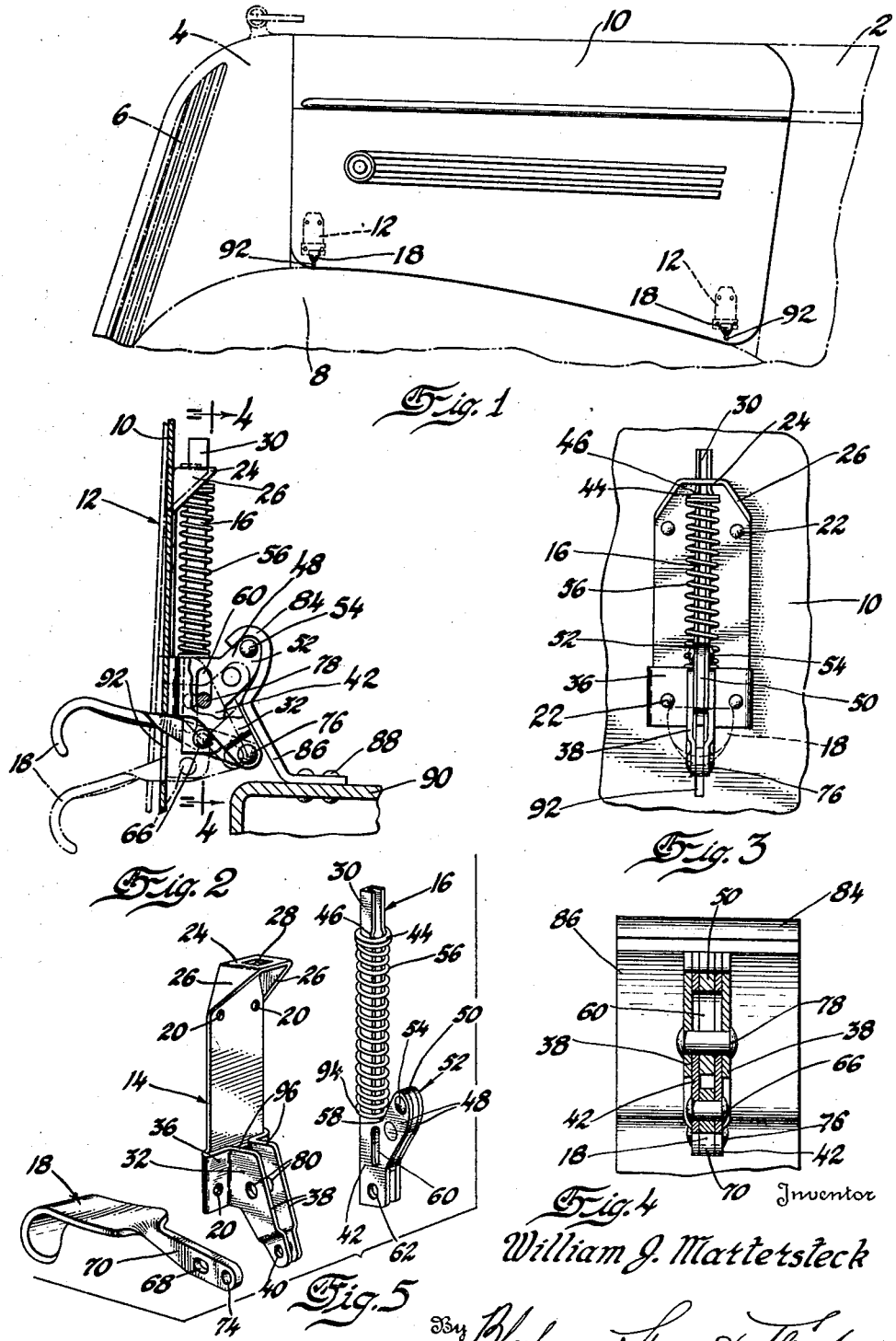

2,089,498

UNITED STATES PATENT OFFICE 2,089,498

HOOD LATCH

William J. Martersteck, Detroit, Mich., assignor to Ternstedt Manufacturing Company, Detroit, Mich., a corporation of Michigan Application May 6, 1936, Serial No. 78,085

4 Claims. (Cl. 292—113)

This invention relates to hood latches used on the hoods of automotive vehicles.

The object of the invention is to design or build a hood latch which is simple in construction and easily installed and lends itself to easy manufacture. The latch itself incorporates specific detailed improvements later described in the specification.

On the drawing

Figure 1 is a side view of a portion of an automotive vehicle showing the hood latch of the invention applied.

Figure 2 is a section through the hood showing the hood latch in operative position in full lines and in inoperative position in dotted outline, parts being broken away better to illustrate the construction.

Figure 3 is a view of the hood latch from the inside of the hood.

Figure 4 is a section through the lower portion of the hood latch on the line 4—4 of Figure 2.

Figure 5 is an expanded perspective view of the parts of the latch.

On the drawing the numeral 2 indicates the cowl of an automotive vehicle. The radiator shell is indicated at 4, the radiator grille at 6, the front fender at 8 and the hinged side portion of the hood at 10. These parts are conventional and per se form no part of the invention. The hood latch of the invention is indicated as a whole at 12, one of the latches being installed at each side of the hood as shown in Figure 1.

The latch itself comprises three main parts, the bracket or frame 14, the bolt 16, and the handle 18. The frame 14 is provided with suitable openings 20 and is secured to the inside of the hood by means of the rivets 22 passing through the openings 20 and mating openings in the hood.

The frame 14 has the upper projection or shelf 24 which is formed by suitably bending the metal inwardly and providing at the same time the lateral strengthening triangular pieces 26. The shelf 24 has the opening 28 therein the purpose of which is to guide the upper end 30 of the bolt 16.

The lower portion of the frame 14 has the lateral extension or shelf 32 formed by inwardly bending as at 36 a portion of metal of the frame. A projection 32 extends downwardly and is forked as at 38, the ends of the forks being provided with openings 40. The tines of the forks 38 are spaced as is best indicated in Figure 3 to receive therebetween the lower end 42 of the bolt 16.

The bolt 16 is preferably formed in channel section of stamped metal as is best shown in Figure 5 and comprises the upper portion 30 and lower portion 42. The upper portion 30 has a washer 44 slipped thereover and the edges of the channel are outwardly bent as at 46 to hold the washer in place. The lower portion 42 has the hook portions 48 formed thereon which are similar and which overlap, and there is received therebetween the filler or spacer 50, the three parts 48 and 50 forming a hook 52. The parts 48 and 50 are secured together by means of the rivets 54. A coil spring 56 is confined on the bolt 16 between the washer 44 and the shoulder 58 formed at the base of the hook 52.

Below the shoulder 58 the bolt 16 and the spacer 50 are slotted as at 60 the purpose of the slot to be later described. The lower end 42 of the bolt has the openings 62 to receive a pin 66 which in turn is received in the elongated opening 68 in the arm 70 of the handle 18. The extremity of the arm 70 has the opening 74 which mates with the openings 40 in the forks 38, the handle being pivoted to the forks by means of the rivet 76.

The parts are assembled by placing the lower end 42 of the bolt in the space between the tines of the forks 38 and then pressing downwardly on the bolt to compress the spring 56. This will allow the upper end 30 to be swung under the shelf 24 and to be projected through the opening 28. The rivet 78 is then passed through the openings 80 in the fork 38 and through the slot 60 in the lower end 42 of the bolt and the mating slot in the spacer 50. The rivet 78 is then turned over on its end as shown in Figure 4. The handle 18 is then applied with the opening 74 mating with the openings 40 and suitably pivoted by the rivet 76. Another pin or rivet 66 is now applied by passing it through the openings 62 in the end 42 of the bolt 16 and through the mating slot 68 in the lever. The parts in their assembled relation are then shown in Figure 2.

In the position of the parts shown in Figure 2 the hook 52 of the latch is shown as engaged under the hooked end 84 of a keeper 86 secured as at 88 to the frame 90 of the vehicle.

The operation of the device is as follows: assuming the parts to be in full line position shown in Figure 2, which is the normal locked position of the hood, the operator presses downwardly on the handle 18 to cause it to move downwardly in the slot 92 in the hood. This downward movement will cause the handle to pivot on the rivet 76 and the ends of the fork 38 and cause the pin or rivet 66 to pull downwardly on the end 42 of the bolt 16. This will pull the entire bolt downwardly and compress the spring 56 because the lower coils 94 of the spring will rest on the edges 96 of the shelf or projection 32. At the same time the downward movement of the handle will pull the hook 52 away from the hooked end 84 of the keeper so that the operator may now pull the hood away from the end 84 and raise the hood. When the hood is returned to its lowered position the operator will press downwardly on the handle 18 to cause the hook 52 to pass under the hooked end 84 of the keeper and be engaged thereunder.

I claim:

1. In a latch for the hoods of automotive vehicles, a frame secured to the hood, projections extending inwardly of the hood adjacent the top and bottom of the frame, said top projection having a guide opening, a bolt slidably mounted in the projections of the frame and guided in the said opening, a hook formed on the lower end of the bolt and adapted to engage a keeper on the vehicle, a spring mounted on the bolt and confined between the projections, a handle pivoted to the lower projection, means to secure the lower end of the bolt to the handle, said handle extending outside the hood, a pin secured in the lower projection extending through the bolt, said bolt having a slot to receive the pin and allow movement of the bolt relative to the projection, the movement of said handle in one direction causing the downward movement of the bolt to cause the hook to be released from the keeper.

2. In a latch for the hoods of automotive vehicles, a frame secured to the hood, projections extending inwardly of the hood adjacent the top and bottom of the frame, said top projection having a guide opening, a bolt slidably mounted in the projections of the frame and guided in the same opening, a hook formed on the lower end of the bolt and adapted to engage a keeper on the vehicle, a spring mounted on the bolt and confined between the projections, a forked extension on the lower projection, a handle pivoted at its end to the end of the forked extension, means to secure the lower end of the bolt to the handle, said handle extending outside the hood, the movement of said handle in one direction causing the downward movement of the bolt to cause the hook to be released from the keeper.

3. In a latch for the hoods of automotive vehicles, a frame secured to the hood, projections extending inwardly of the hood near the top and bottom of the frame, said top projection having a guide opening, a bolt slidably mounted in the projections of the frame and guided in the said opening, an upwardly projecting hook formed on the lower end of the bolt and adapted to engage a keeper on the vehicle, a coil spring surrounding the bolt and confined between the projections, a handle pivoted to the lower projection, means to secure the lower end of the bolt to the handle, said handle extending outside the hood, the movement of the said handle in one direction causing the downward movement of the bolt to cause the hook to be released from the keeper.

4. In a latch for the hoods of automotive vehicles, a frame secured to the hood, projections extending inwardly of the hood near the top and bottom of the frame, said top projection having a guide opening, a bolt slidably mounted in the projections of the frame and guided in the said opening, an upwardly projecting hook formed on the lower end of the bolt and adapted to engage a keeper on the vehicle, a coil spring surrounding the bolt and confined between the projections, a forked downwardly extending extension on the lower projection, a handle pivoted at its end to the end of the forked extension, means to secure the lower end of the bolt to the handle, said handle extending outside the hood, the movement of said handle in one direction causing the downward movement of the bolt to cause the hook to be released from the keeper.

WILLIAM J. MARTERSTECK.